United States Patent
Ko et al.

(10) Patent No.: US 10,680,939 B2
(45) Date of Patent: *Jun. 9, 2020

(54) HYBRID FLOOD-RELAYING AND ROUTING MESH NETWORKS

(71) Applicant: MEDIATEK INC., Taiwan (CN)

(72) Inventors: Li-Chun Ko, Taiwan (CN); Rongsheng Huang, Fremont, CA (US)

(73) Assignee: MEDIATEK INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/641,742

(22) Filed: Jul. 5, 2017

(65) Prior Publication Data

US 2018/0013665 A1    Jan. 11, 2018

Related U.S. Application Data

(60) Provisional application No. 62/415,544, filed on Nov. 1, 2016, provisional application No. 62/358,194, filed on Jul. 5, 2016.

(51) Int. Cl.
*H04L 12/721* (2013.01)
*H04L 12/707* (2013.01)
(Continued)

(52) U.S. Cl.
CPC ............ *H04L 45/32* (2013.01); *H04L 45/123* (2013.01); *H04L 45/16* (2013.01); *H04L 45/24* (2013.01);
(Continued)

(58) Field of Classification Search
CPC ....... H04L 45/123; H04L 45/16; H04L 45/24; H04L 45/32; H04W 84/18; H04W 40/22; H04W 40/24
See application file for complete search history.

(56) References Cited

U.S. PATENT DOCUMENTS

2009/0135824 A1*  5/2009  Liu ................. H04L 45/02
                                                  370/392
2013/0250754 A1    9/2013  Vasseur et al.
(Continued)

OTHER PUBLICATIONS

Xie Huawei & USTC Y Sun Institute of Computing Technology G Wang Huawei(USA) H Wu H. "Scalable Hybrid Routing for Information-Centric Networks; drafft-xie-icnrg-hybrid-routing-00. txt", Internet Engineering Task Force, IEFT; Standardworkingdraft,Internet Society (ISOC) 4, Rue Des Falaises Ch-1205, Geneva, Switzerland.

*Primary Examiner* — Yemane Mesfin
*Assistant Examiner* — Henry Baron (57) ABSTRACT

Systems and methods of mesh network communication enabling a relay node to autonomously select a packet propagation mechanism. Upon receiving a packet, which may carry an indication for flooding propagation as set by the edge node originating the packet, or carry no specification for any propagation mode, the relay node determines whether the packet is eligible for routing-propagation based on a number of factors, such as whether there is an existent valid route from the source node to the destination node, whether the packet is originated from a friend edge node, and whether a route discovery process has been initiated. Accordingly, the relay node may change the indication to routing propagation and forward it by routing-relaying. Thus, the packet can be propagated over the mesh network by routing propagation, despite the initial setting for flooding propagation as specified by the edge node or no setting by the edge node.

24 Claims, 6 Drawing Sheets

(51) Int. Cl.
*H04L 12/751* (2013.01)
*H04L 12/761* (2013.01)
*H04W 40/24* (2009.01)
*H04W 84/18* (2009.01)
*H04W 40/22* (2009.01)
*H04W 40/26* (2009.01)

(52) U.S. Cl.
CPC ........... *H04W 40/22* (2013.01); *H04W 40/24* (2013.01); *H04W 84/18* (2013.01); *H04L 45/02* (2013.01); *H04L 45/26* (2013.01); *H04W 40/26* (2013.01)

(56) References Cited

U.S. PATENT DOCUMENTS

2017/0111266 A1    4/2017   Ko
2017/0149658 A1*   5/2017   Rimhagen ............. H04W 40/26

\* cited by examiner

301 — A high end relay node receiving a packet

302 — Does the RP indication indicate routing propagation (RP=1)?
- Yes →
- No ↓

303 — Does a valid route exist from Source to Destination?
- No → 306 — Forwarding the packet by flood-relaying with the RP remaining to indicate flooding
- Yes ↓

304 — Modifying RP indication to indicate routing propagation

305 — Forwarding the packet by routing-relaying

HYBRID FLOOD-RELAYING AND ROUTING MESH NETWORKS

CROSSREFERENCE TO RELATED APPLICATION

This patent application claims priority and benefit of U.S. Provisional Patent Application No. 62/415,544, entitled "DATA DELIVERY WITH PROXY RELAYS FOR HYBRID FLOOD-RELAYING AND ROUTING MESH NETWORKS," filed on Nov. 1, 2016, and U.S. Provisional Patent Application No. 62/358,194, entitled "AUTONOMOUS SELECTION OF DATA DELIVERY METHODS FOR MESH NETWORKS," filed on Jul. 5, 2016. The entire contents of the foregoing patent applications are herein incorporated by reference for all purposes.

TECHNICAL FIELD

The present disclosure relates generally to the field of network communication, more specifically, to the field of packet forwarding mechanisms in mesh network communication.

BACKGROUND OF THE INVENTION

A mesh network typically includes a plurality of nodes that communicate with each other for data propagation. A mesh network can propagate messages by using either a flooding approach or a routing approach. In the routing propagation approach, a message (e.g., a packet) traverses along a specific path by hopping from a relay node to another until it reaches the destination node. In the flooding propagation approach, instead of a specific route, the message is sent to all the linked nodes in the mesh network, including the unintended nodes.

Generally speaking, flooding propagation is less efficient in terms of power and bandwidth usage than routing propagation, mainly because multiple nodes within a reception range retransmit the message approximately at the same time. The resultant collisions inevitably increase energy consumption and network overhead to unreasonable levels. Also, because relay nodes incur a lot of unnecessary packet transmission in flooding propagation, a flooding-based mesh network is usually difficult to scale up. Compared to flooding propagation, routing propagation is advantageous due to lower overhead traffic and better scalability.

On the other hand, flooding propagation offers greater simplicity in terms of implementation of communication logic in the network nodes since no sophisticated routing techniques are involved. Moreover, in flooding, signals usually arrive at a node through several propagation paths, and therefore one or several blocked paths are usually of no consequence, which ensures high reachability and reliability.

Some network devices acting as a relay node in a mesh network may only have the capability to forward packets by flood-relaying (which may be referred to as a "normal relay node" herein), where each packet received by such a node is sent to all coupled links except the one that the packet arrived on. In contrast, some other network devices acting as a relay node have enhanced configurations enabling it to forward packets by routing-relaying (which may be referred to as a "high end relay node" herein), in which a packet is transmitted to a next node along a specific or prescribed route. Typically, such a high end relay node can also perform flood-relaying.

Normal relay nodes are easy to implement due to the low computation and memory requirements of flood-relaying. High end relay nodes feature increased development and manufacturing costs due to increased memory capacity, computing power, and design complexity. For example, a high end node may integrate logic for network management, self-discovery, self-repair, routing tables and/or routing information management and communication, which are not included in the normal relay nodes with no routing-relaying capability.

Figure 1:
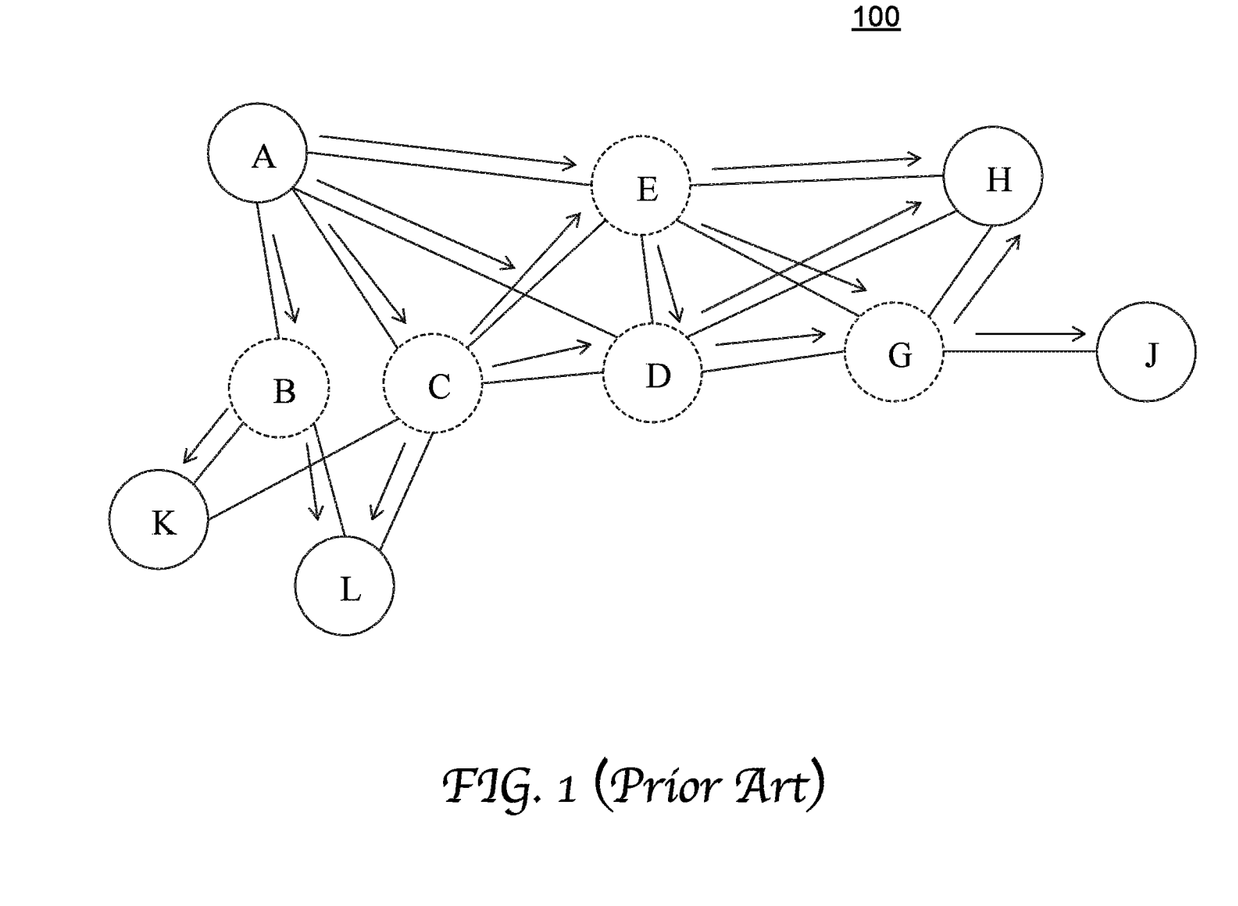
FIG. 1 illustrates a mesh network system in which packet propagation is exclusively based on flooding in accordance with the prior art.

FIG. 1 illustrates a mesh network system 100 in which packet propagation is exclusively based on flooding in accordance with the prior art. As illustrated in a simplified form, the network 100 is composed of edge nodes A, K, L, H and J and normal relay nodes B, C, E, D and G. Each edge node is capable of originating packets but typically not capable of forwarding packets; and each normal relay node is capable of forwarding packets to other nodes by flood-relaying.

For instance, edge node A generates a packet and specifies edge node J as the destination node. The flooding-based propagation of the packet is depicted by the arrows. More specifically, edge node A transmits the packet to each of the relay nodes B, C, D and E that are directly linked to A, and each of B, C, D and E forwards the packet to all of its directly-linked nodes except A, and so on. Particularly, B transmits the packet to K and L; C transmits the packets to L, E, and D; and E transmits the packet to C, D and H. Eventually, the packet is delivered to the destination node J through G. As demonstrated, although K, L and H, as well as several relay nodes linked to them, are unintended recipients, the packet is still delivered to them, resulting in significant bandwidth and power inefficiency.

Figure 2:
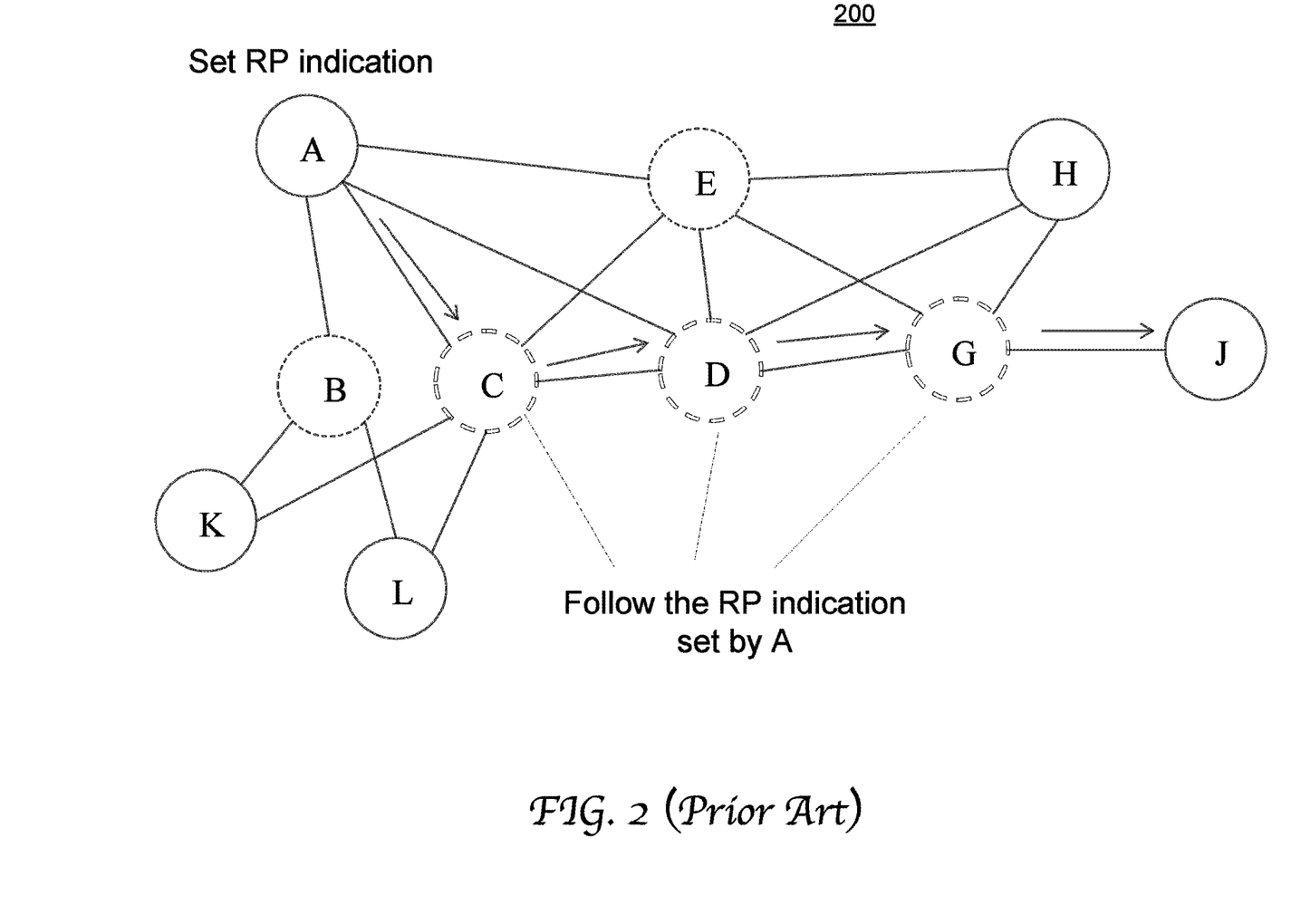
FIG. 2 illustrates a mesh network system allowing both flooding-based and routing-based packet propagation in accordance with the prior art.

FIG. 2 illustrates a mesh network system 200 allowing both flooding-based and routing-based packet propagation in accordance with the prior art. As illustrated, the network 200 is composed of edge nodes A, K, L, H and J, normal relay nodes B and E, and high end relay nodes C, D and G.

When edge node A generates a packet directed to the destination node J, it is specified in the packet header whether the packet is to be propagated to J by flooding or by routing, for example by using a routing protocol (RP) flag. If the RP flag indicates flooding propagation, all the relay nodes participate the propagation and forward the packet by flood-relaying, including the normal and the high end ones. On the other hand, if the RP flag indicates routing propagation, only the high end relay nodes participate the propagation and accordingly forward the packet by routing-relaying. A normal relay node receiving the packet may discard it due to lack of routing-relay capability.

Thus, according to the prior art, once the RP indication is set by the edge node, the corresponding propagation approach is used through the entire packet propagation process. High end relay nodes in the mesh network act as routing relays only if the edge node selects routing propagation for a packet. This limitation causes inefficient use of the enhanced capacities and benefits offered by high end relay nodes and routing propagation in the mesh network. In addition, this requires the edge node have routing capability which may not always be true in a real life.

SUMMARY OF THE INVENTION

Accordingly, methods and systems disclosed herein are directed to a communication protocol allowing expanded use of routing propagation in a mesh network with a hybrid capability of flooding propagation and routing propagation, thereby improving the balance between cost and performance efficiency.

Embodiments of the present disclosure include relay nodes operable to convert a packet to a routing-propagation packet, despite an original flooding-propagation indication specified by the edge node. More specifically, a mesh network is composed of: edge nodes that can originate packets; relay nodes that support using flood-relaying to forward packets but do not support routing-relaying (the so-called "normal relay nodes"); and high end relay nodes that support both flood-relaying and routing-relay. An edge node originating a packet may or may not have routing-capability. If it has routing capability and determines that there is a valid route from the source node to the destination node, the edge node may set a routing protocol (RP) indication to indicate routing-propagation; otherwise, the RP indication is set to indicate flooding-propagation.

When a high end relay node receives a packet with a routing protocol (RP) indication indicating flooding-propagation or propagation mode unspecified, it determines whether there is an existent valid route from the source node (e.g., the edge node) toward the destination node. If yes, the high end relay node modifies the RP indication to indicate routing-propagation and forwards the packet through routing-relay. If the high end relay node determines that there is no existent valid route, it forwards the instant packet by flood-relaying and may initiate a route discovery process to discover a route to be used for subsequent packet routing-relaying. If a normal relay node receives a packet with the RP indication indicating routing-relay, it discards the packet without forwarding.

In some embodiments, a high end relay node designated to convert a flooding-propagation packet or a propagation mode-unspecified packet to a routing-propagation packet is directly linked to the edge node that originates the packet, e.g., a first forwarding relay node. In some embodiments, a high end relay node is configured to perform such conversion and/or initiate route discovery only for packets originated from a friend edge node. Further, in route discovery, the high end relay node may act as a proxy of the source node to discover a route between the source node to the destination node. Thus in some embodiments, when the high end relay node receives the packet, the indication may indicate 3 possible scenarios: flooding propagation, routing propagation and propagation mode unspecified. After the relay node processes the packet, the indication may indicate 2 possible scenarios: flooding propagation and routing propagation.

By using a high end relay node to autonomously determine routing-propagation viability of a packet and accordingly convert a flooding-propagation packet or a propagation mode-unspecified packet to a routing-propagation packet, the chances of using routing-relaying in a mesh network is advantageously and substantially expanded. As a result, the balance between cost and efficiency can be optimized, given that routing-relaying provided by high end relay nodes offers lower power consumption and network overhead. In addition, using a relay node to perform routing propagation related processes exempts the necessity of using an edge node for such processes, like route discovery and routing information maintenance. Therefore, even with an edge node lacking routing capability, the mesh network can still effectively take the benefit of routing propagation provided by the high end relay nodes.

According to one embodiment of the present disclosure, a method of forwarding a packet by a relay node in a mesh network includes receiving the packet at the relay node, the packet identifying an edge node that generates the packet and a destination node. The packet includes an indication for flooding-propagation or propagation mode unspecified. Responsive to a determination that a valid route toward the destination node exists, the relay node modifies the indication in the packet to indicate routing propagating. The relay node then forwards the packet to a next node by routing-relaying and according to the valid route.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Hybrid Flood-Relaying and Routing Mesh Networks

Overall, embodiments of the present disclosure provide a mesh network communication protocol that enables a relay node with both routing-relaying and flood-relaying capability to select a packet propagation approach and a packet forwarding mode. More specifically, upon receiving a packet, which may carry an indication for flooding-propagation in the mesh network or propagation mode unspecified, the relay node autonomously determines whether the packet is eligible for routing-propagation based on a number of factors, such as whether there is an existent valid route from the source node to the destination node, whether the packet is originated from a friend edge node, and whether a route discovery process has been initiated. Based on the determination, the relay node may change the indication in the packet to routing propagation and forward the packet in the manner of routing-relaying. As a result, the packet can be advantageously propagated over the mesh network by routing propagation, despite the initial indication produced by the edge node. Thus, in some embodiments, when the high end relay node receives the packet, the indication may indicate 3 possible scenarios: flooding propagation, routing propagation and propagation mode unspecified. After the relay node processes the packet, the indication may indicate 2 possible scenarios: flooding propagation and routing propagation.

A mesh network referred herein may be a wired or wireless communication mesh network. In a wireless mesh network, mesh clients, mesh routers and gateways are arranged as the network nodes and can communicate with each other via over-the-air radio frequency links. Mesh clients may be laptops, cell phones and other communication devices, etc., while the mesh routers forward traffic to and from the gateways which may or may not be connected to the Internet.

A network node referred herein can send and receive messages, and can function as a router to relay messages for its neighbor nodes. The network nodes in a mesh network may communicate using wireless protocols and techniques compatible with one or more of wireless standards, such as IEEE 802.11x family for WLAN, IEEE 802.15 for WPAN, and IEEE 802.16 for WMAN. However the present disclosure is not limited thereto.

When an edge node originates a packet, a particular field in the packet is assigned a value which indicates routing propagation or flooding propagation. In the embodiments described in detail herein, a routing protocol (RP) flag in the packet is set to 1 if routing propagation is selected; otherwise RP is set to 0, e.g., by default. However, it will be appreciated that the present disclosure is not limited to any specific mechanism or indicia for indicating flooding or routing propagation in a packet, nor limited to any specific mechanism in a receiving node for interpreting such an indication.

For an edge node that supports only flooding propagation, a produced packet always has the RP flag be 0. However, if it supports both flooding and routing propagation, the edge node may first determine whether there is a valid route from the source node to the destination node, e.g., a valid route for previous packets. If yes, the RP flag is set as "1" and the edge node initiates routing propagation of the packet; otherwise, the RP flag is set as "0" and the edge node initiates the flooding propagation.

Conventionally, as described with reference to FIG. 2, once flooding is selected and set for propagating a packet at the edge node, the packet is propagated over the mesh network by flooding until delivered to the destination node. However, according to embodiments of the present disclosure, a relay node with routing capability (e.g., a high end relay node) may autonomously determine whether routing propagation is suitable and thereby override the propagation approach set by the edge node.

Figure 3:
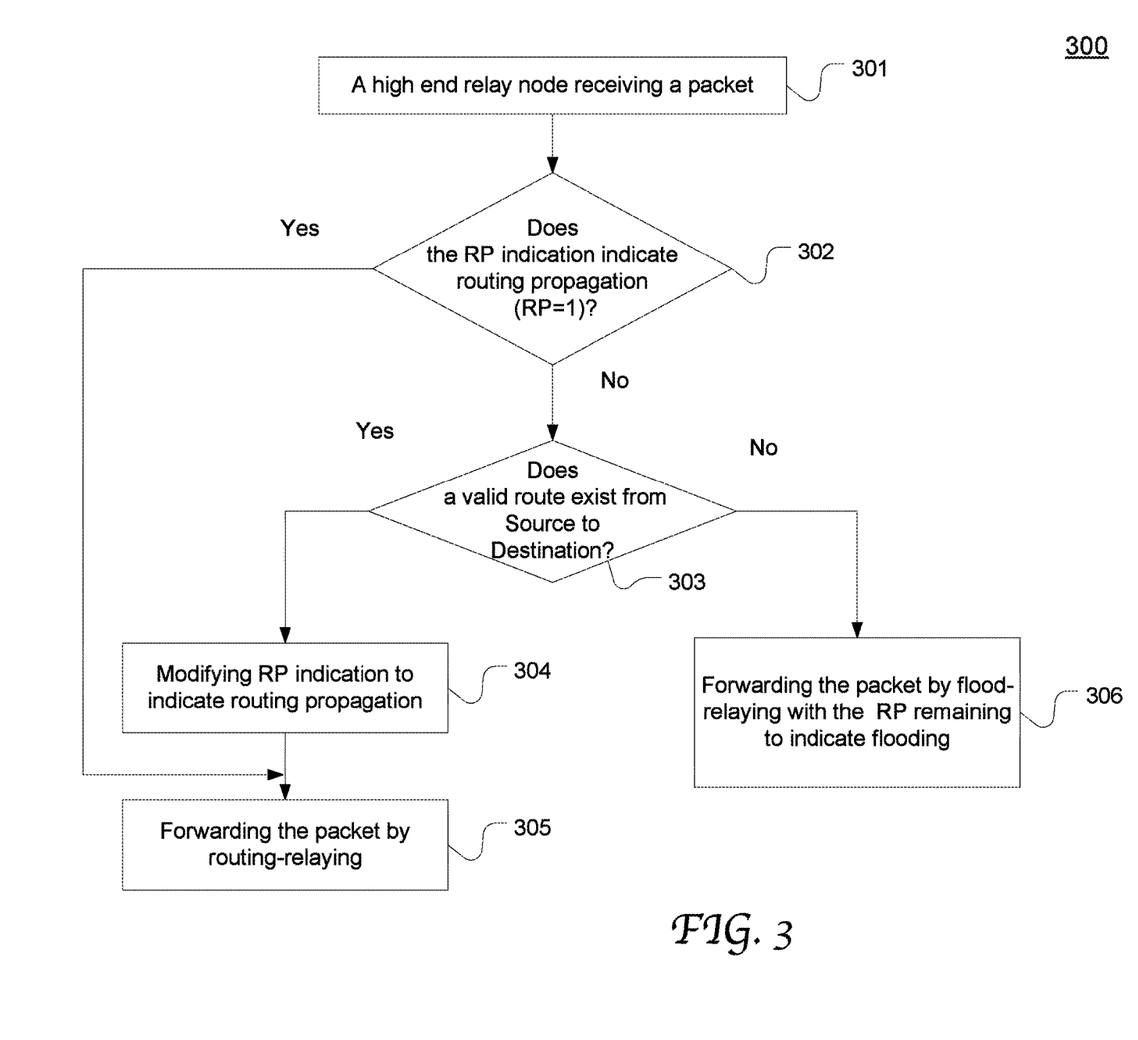
FIG. 3 is a flow chart depicting an exemplary process of a high end relay node selecting a packet propagation mode in a mesh network system in accordance with an embodiment of the present disclosure.

FIG. 3 is a flow chart depicting an exemplary process 300 of a high end relay node selecting a packet propagation mode in a mesh network system in accordance with an embodiment of the present disclosure. The mesh network has a combination of edge nodes, normal relay nodes and high end relay nodes. Each edge node supports producing and consuming packets, yet may be incapable of forwarding packets. Each normal relay node can produce and consume packets and forward packets by flood-relaying but not routing-relaying. Each high end relay node can produce and consume packets and can forward packets by routing-relaying and flood-relaying. For example, a high end relay node may have logic for network management, self-discovery, self-repair, routing tables and/or routing information management and communication, which are not included in the normal relay nodes with no routing-relaying capability.

As illustrated, at 300, a high end relay node receives a packet with an RP indication in the header, e.g., in the form of a flag. The packet may have been directly transmitted from the edge node originating the packet, or may have been forwarded from another relay node. At 302, the high end relay node determines whether the packet has been designated for flood propagation or routing propagation based on the RP indication. If routing propagation is indicated (RP=1) and if the relay node is on the specific route toward the destination node, the high end edge node forwards the packet by routing-relaying at 305. Thereafter, the packet is propagated through the mesh network via the specific route.

If the RP indication in the packet indicates flooding propagation (as determined at 302) or if neither propagation approach is specified in the packet, the high end relay node determines whether a valid route exists from the source node to the destination node, at 303. If yes, the high end relay node modifies the RP indication to indicate routing propagation at 304, and forwards the packets by routing-relaying at 305. However, if it is determined that no valid route exists at 303, the RP indication is unchanged and remains to indicate flooding propagation, and the high end edge node forwards the packet by flood-relaying at 306. Thereafter, as the packet propagates through the subsequent nodes in the mesh network, the indication continues to indicate flooding propagation.

As described in greater detail below, in some embodiments, only a high end relay node with a special status is designated to perform autonomous determination whether to convert a flooding-propagation packet to a routing-propagation one. For example, the high end relay node is directly linked to the edge node originating the packet (e.g., a first layer relay node), and/or a friend node with the edge node. Thus, if a high end relay node without the special status receives the packet, it simply forwards the packet as indicated by the RP indication in the packet, which was set by the edge node or the high end relay node with the special status by using process 300.

By using a high end relay node to autonomously determine routing-propagation viability of a packet and accordingly convert a flooding-propagation packet or a packet with no propagation mode specified to a routing-propagation packet, the chances of using routing-relaying in a mesh network is advantageously and substantially expanded. As a result, the balance between cost and efficiency can be optimized, given that routing-relaying provided by high end relay nodes offers lower power consumption and network overhead. In addition, using a relay node to perform routing propagation related processes obviates the necessity of using an edge node for such processes, like route discovery and routing information maintenance. Therefore, even with an edge node lacking routing capability, the mesh network can still effectively take the benefit of routing propagation provided by the high end relay nodes.

Figure 4:
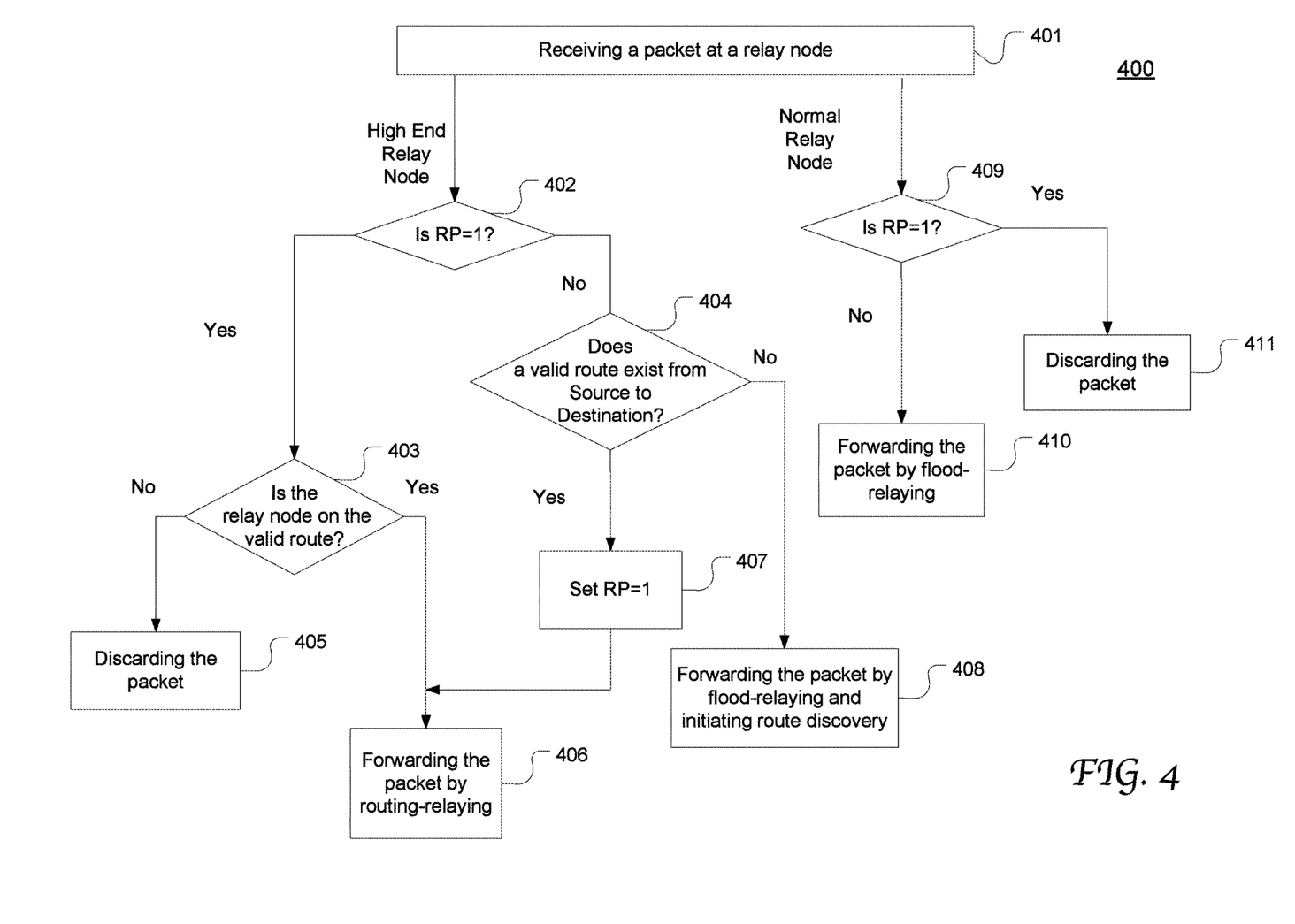
FIG. 4 illustrates exemplary processes of forwarding a packet by a normal relay node and a high end relay node in accordance with an embodiment of the present disclosure.

In some embodiments, if a high end relay node determines that no valid route exists for routing propagation (e.g., no prior record), the relay node may autonomously initiate a route discovery process to discover a valid route for the packet. FIG. 4 illustrates exemplary computer controlled processes 400 of forwarding a packet by a normal relay node and a high end relay node in accordance with an embodiment of the present disclosure. The packet may have been transmitted directly from an edge node or from another relay node. If a high end relay node receives the packet, the relay node follows the process flow on the left side of the Figure; and if a normal relay node receives the packet, the relay node follows the process flow on the right side of the Figure.

More specifically, at 402, the high end relay node determines whether the RP flag is 1 (indicating routing propagation). If yes, the high end relay node further determines whether it is the on the specific route at 403. If it is not on the valid route, meaning the relay node is not an intended recipient, it discards the packet without further processing at 404. However, if the relay node is on the valid route, meaning it is an intended recipient, it forwards the packet by routing-relaying as indicated by the RP flag at 406.

On the other hand, if the RP flag as received is 0 which indicates flooding propagation or propagation mode unspecified (as determined by the relay node at 402), the relay node autonomously determines whether the packet is suitable for routing propagation towards the destination node, rather than directly forwarding the packet by flood-relaying. Thus, at 404, the relay node determines whether it has a valid route for the packet from the source node to the destination node. If yes, the relay node modifies the RP flag value to 1 at 407 and forwards the packet by routing-relaying at 406. Thereafter, the packet is propagated through the mesh network via the valid route.

If no valid route exists (as determined at 404), the relay node forwards the packet by flood-relaying and also initiates route discovery in an attempt to discover a valid route for subsequent packets toward the destination node. In some embodiments, a route discovery process is only performed by a particular high end relay node, for example, which is directly linked to the edge node or befriended by the edge node, or otherwise designated with a certain special status in the mesh network. The present disclosure is not limited to any specific special status used for designating a relay node to convert a flooding-propagation packet to a routing-propagation packet, and/or initiate and perform routing discovery for a packet.

As shown in the process flow on the right side of the Figure, if a normal relay node without routing capability receives the packet, it identifies the value of the RP flag at 409. If RP=0 which indicates flooding propagation or no specification for either flooding or routing, the relay node forwards the packet by flood-relaying. If the RP=0 which indicates routing propagation, the relay node discards the packet without further processing.

Figure 5:
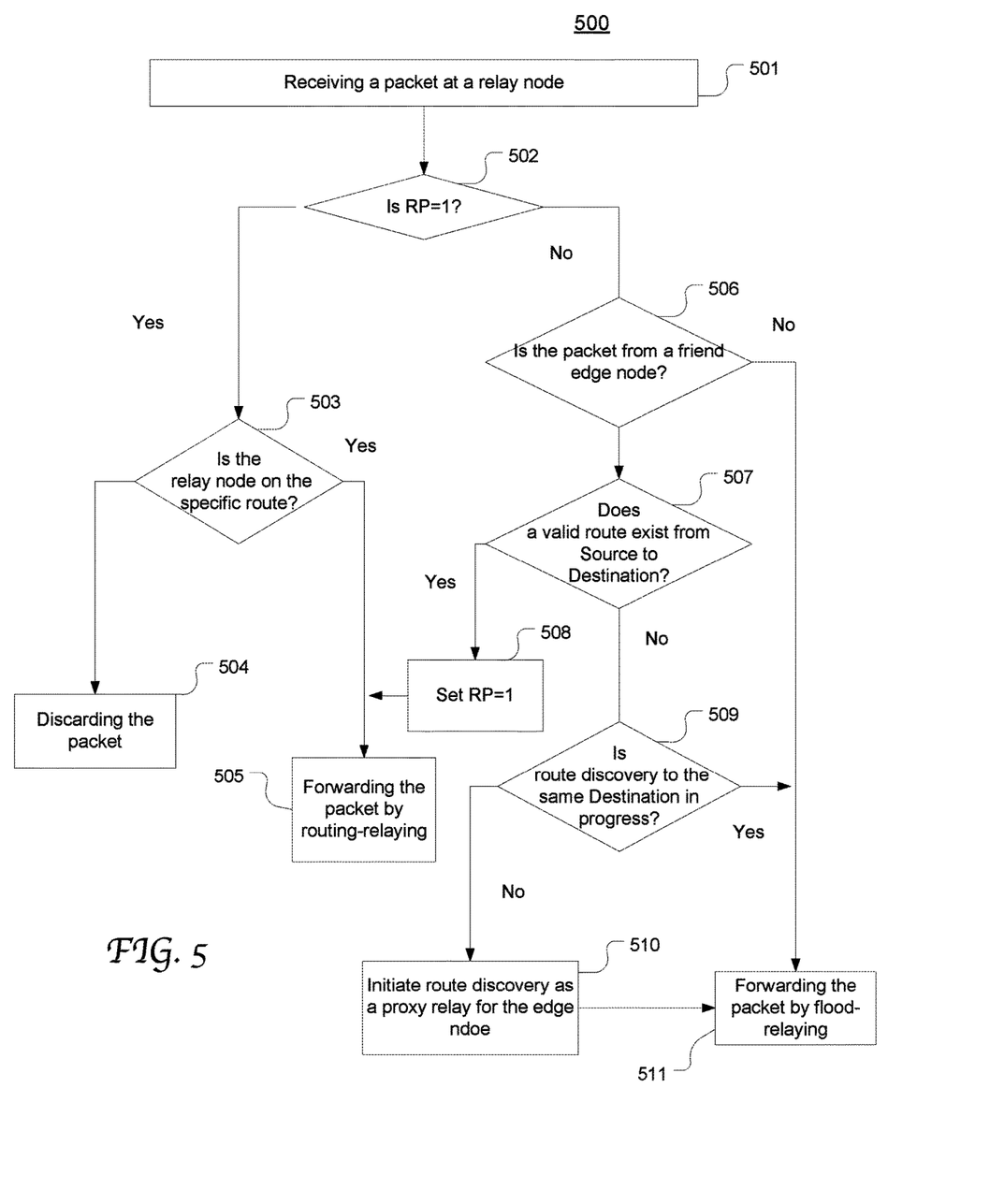
FIG. 5 is a flow chart depicting an exemplary process of a high end relay node processing and forwarding a packet in accordance with an embodiment of the present disclosure.

FIG. 5 is a flow chart depicting an exemplary computer controlled process 500 of a high end relay node processing and forwarding a packet in accordance with an embodiment of the present disclosure. At 501, the relay node receives a packet, e.g., from an edge node or from another relay node. At 502, the relay node determines whether the RP flag is set as 1 which indicates routing propagation. If yes, at 503, the relay node determines whether it is on the specific route for the routing propagation. If the relay node is on the specific route and thus is the intended recipient, it forwards the packet by routing-relaying at 505. If the relay node is not on the specific route (as determined at 503), it discards the packet without further processing.

If the packet as received has the RP flag set as 0 (as determined at 502), at 506, the relay node determines whether the packet is from a friend edge node, which means the relay node has previously established a friendship with (or befriended by) the edge node.

In general, two friend nodes can communicate packets using friendship security material or encrypted material. If a relay node outside the friend relation receives a packet with such security material, the relay node simply discards it. Further, if an edge node has routing capability, a friend relay node can buffer incoming messages for the edge node while the edge node is placed in a power-saving mode. When the edge node wakes up, its friend relay node can send the packets to the edge node for processing.

Further, if an edge node does not support routing propagation, its friend relay node can use friendship security material for outgoing messages and can act on behalf of the edge node to generate or process and route control messages and route data messages. When the relay node receives an outgoing message from the edge node on the advertising bearer using the friendship security material, if a valid route to the destination node already exists, the message can be delivered over the routing bearer. If not, the outgoing message is delivered over the advertising bearer and the relay node initiates route initialization as a friend route originator.

As shown in FIG. 5, if the relay node determines that the packet is from a friend edge node (at 506), it then determines whether there is an existent valid route from the source node to the destination node at 507. If yes, the relay node modifies the RP flag to 1 and forwards the packet by routing-relaying. Thereafter, the packet is propagated through the mesh network via the valid route. If there is no existent valid route known to the relay node (as determined at 507), the relay node further determines if a route discovery process to the same destination node is in progress at 509. If yes, meaning a route discovery process has been initialized, the relay node forwards the instant packet by flood-relaying while continuing the route discovery process. If a route discovery process is not in progress as determined at 509, the relay node initiates route discovery at 510 and also forwards the instant packet by flood-relaying at 511. A later discovered route may be used for routing subsequent packets to the same destination node.

In this embodiment, the relay node performs route discovery as a proxy relay for the edge node at 510 to discover a route from the edge/source node to the destination node. However, the present disclosure is not limited thereto. In some other embodiments, the relay node may discovery a route from itself to the destination node instead.

It will be appreciated that the present disclosure is not limited to any specific manner to implement the processes as shown in FIGS. 3-5. In other words, hardware logic, software logic or a combination thereof can be used to configure and enable the processes disclosed herein.

Figure 6:
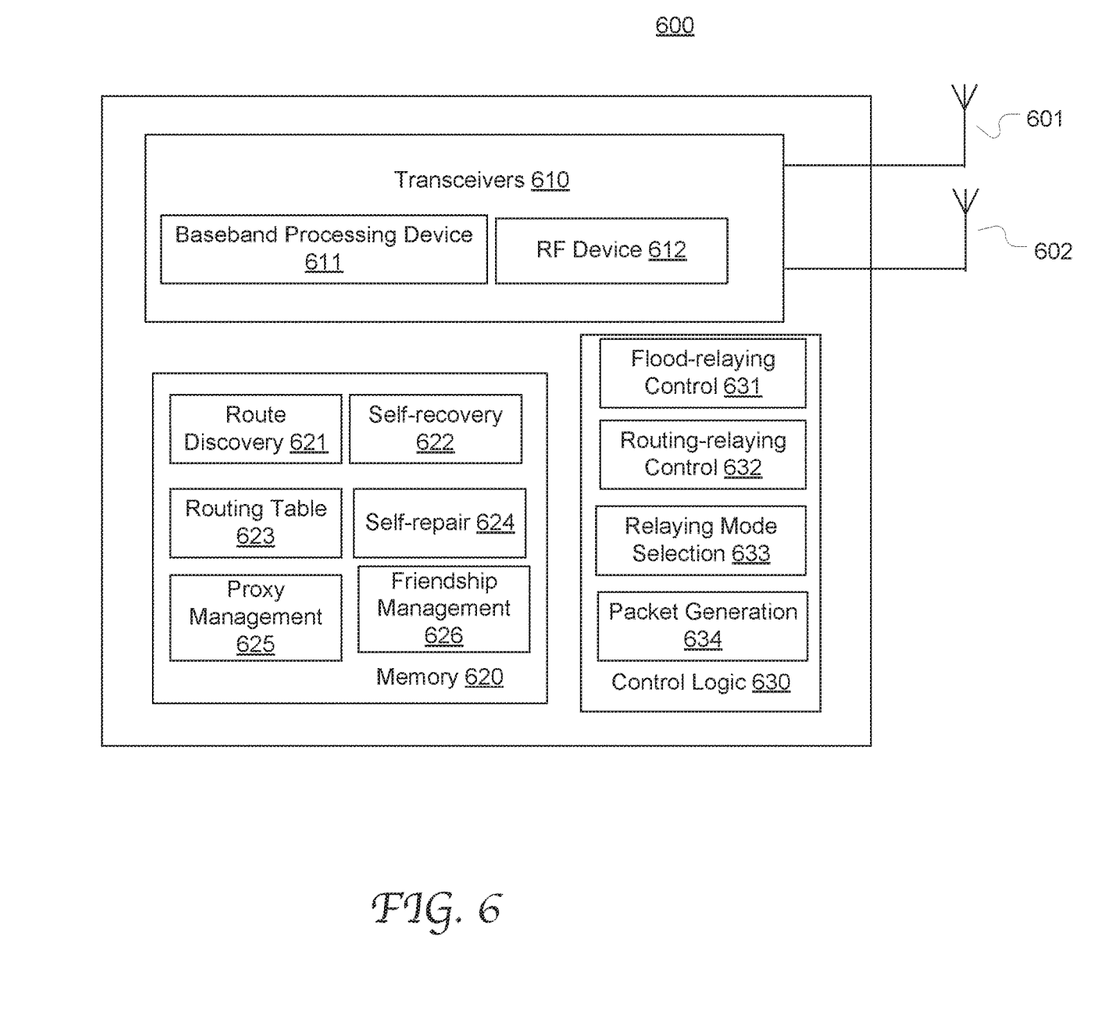
FIG. 6 is a block diagram illustrating an exemplary configuration of a wireless communication device that can be used as a high end relay node and autonomously select a packet propagation mode in a mesh network system in accordance with an embodiment of the present disclosure.

FIG. 6 is a block diagram illustrating an exemplary configuration of a wireless communication device 600 that can be used as a high end relay node and autonomously select a packet propagation mode in a wireless mesh network in accordance with an embodiment of the present disclosure. Device 600 may be a general purpose computer, a laptop, a desktop, a mobile phone, smart TV, game console, or other type of computing devices, etc. The device 600 includes a wireless transceiver 610 having a baseband processing device 611, a radio frequency (RF) device 612 and antennas, e.g., 601 and 602. The baseband processing device 611 may include a variety of components configured to perform baseband processing, including Analog-to-Digital conversion (ADC), Digital-to-Analog Conversion (DAC), gain adjusting, modulation/demodulation, encoding/decoding, and so on.

The RF device 612 can receive the RF wireless signals via the antennas 601 and 602, convert received RF signals to baseband signals for supply to the baseband processing device 611. The RF device 612 can also receive baseband signals from the baseband processing device 611, convert them to RF wireless signals and send to the antennas 601-602 for transmission. The RF device 612 may include a variety of components that are well known in the art.

The wireless communication device 600 includes a memory 620 storing information, application programs and functional modules related to packet propagation, packet forwarding and route discovery, such as a route discovery module 621, a self-recovery module 622, a routing table 623, a self-repair module 624, a proxy management module 625 and a friendship management module 626. The route discovery module 621, in conjunction with the routing table 623, can be executed for discovering a valid route from the edge/source node to the destination node for a packet. The self-recovery module 622 and the self-repair module 624 implement algorithms to recover and repair a broken or unreliable link in the mesh network. The proxy management module 625 and the friendship management module 626 can be used for establishing and maintaining the respective special relations with other nodes, such as an edge node or another relay node.

The wireless communication device 600 further includes control logic, in combination with the software logic stored in the memory 620, that enables the device to perform packet generation, packet forwarding, packet propagation control and route discovery as described in greater detail with reference to FIGS. 3-5. Herein, particularly, the control logic 630 includes a relaying mode selection module 633 operable to determine whether to forward the packet by routing-relaying or flood-relaying and further operable to convert a flooding propagation packet to a routing propagation packet, according to the processes described in greater detail with reference to FIGS. 3-5. The relaying mode selection module 633 can also determine whether to initiate a route discovery process for a packet, and, if yes, the route discovery module 621 can be executed for route discovery.

Once a packet forwarding mode is selected, the flood-relaying control module 631 or the routing-relaying control module 632 operates to forward the packet to next node(s), according to any suitable process, method or protocol that is well known in the art. The control logic also includes a packet generation module 634 for controlling packet generation according to a suitable protocol and format. The control logic may be integrated in a central processing unit (CPU) or the transceiver, or may be a separate unit in the device. The control logic may include a range of other components and functions for packet processing and other applications that are well known in the art and may be implemented by using hardware logic, software logic or a combination thereof.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of forwarding a packet by a relay node in a mesh network, said method comprising:
   receiving said packet at said relay node, wherein said packet identifies an edge node that generated said packet and a destination node and comprises an indication;
   determining if a valid route to said destination node exists and a propagation mode indicated by said indication, wherein said propagation mode is at least one of flooding propagation, routing propagation and propagation mode unspecified;
   responsive to the determination that a valid route to said destination node exists and said propagation mode is flooding propagation or propagation mode unspecified, modifying said indication in said packet to routing propagation; and
   forwarding said packet from said relay node to a next node by routing-relaying and in accordance with said valid route.

2. The method of claim 1 further comprising:
   responsive to determining that no valid route exists after route discovery has been performed and said indication indicates said propagation mode is either flooding propagation or propagation mode unspecified, forwarding said packet from said relay node to next nodes by flood-relaying.

3. The method of claim 1 further comprising:
   responsive to a determination that no route discovery has been performed, no valid route exists and said indication indicates said propagation mode is either flooding propagation or propagation mode unspecified, initiating a route discovery process at said relay node to discover a route to said destination node.

4. The method of claim 1, wherein said determining whether a valid route to said destination node exists is performed responsive to a determination that said relay node is a friend node of said edge node with which the relay node has a previous connection.

5. The method of claim 3, wherein said route discovery comprises said relay node acting as a proxy relay of said edge node for route discovery.

6. The method of claim 3 further comprising, responsive to a determination that a route discovery process is in progress at said relay node, forwarding said packet to next nodes by flood-relaying.

7. The method of claim 1, wherein said relay node is directly linked to said edge node and another relay node, wherein said relay node is configured to participate in both flooding propagation and routing propagation, and wherein further said edge node and said another relay node are configured to participate in only flooding propagation.

8. The method of claim 1 further comprising: responsive to a determination that said indication indicates a propagation mode by routing propagation through a valid route and responsive to a determination that said relay node is not encompassed in said valid route, discarding said packet at said relay node.

9. A wireless communication device operable to be a relay node in a mesh network, said wireless communication device comprising:
   a memory;
   communication circuitry configured to communicatively couple to said mesh network, wherein said communication circuitry comprises a transceiver configured to receive a packet originated from an edge node in said mesh network and to transmit said packet over said mesh network, and wherein further said packet identifies said edge node and a destination node and comprises an indication; and
   control logic coupled to said memory and said transceiver and configured to:
      determine if a valid route to said destination node exists and a propagation mode indicated by said indication, wherein said propagation mode is at least one of flooding propagation, routing propagation and propagation mode unspecified;
      responsive to the determination that a valid route to said destination node exists and said propagation mode is flooding propagation or propagation mode unspecified, modifying said indication in said packet to routing propagation; and
      initiate forwarding of said packet to a next node according to said valid route.

10. The wireless communication device of claim 9, wherein said control logic is further configured to:
   responsive to determining that no valid route exists after route discovery has been performed and said indication indicates propagating said packet by flooding propagation or propagation mode unspecified, initiate forwarding of said packet to next nodes by flood-relaying.

11. The wireless communication device of claim 9, wherein said control logic is further configured to:
   responsive to a determination that no route discovery has been performed, no valid route exists and said indication indicates propagating said packet by flooding propagation or propagation mode unspecified, initiate a route discovery process to discover a route to said destination node.

12. The wireless communication device of claim 9, wherein to determine if a valid route to said destination node exists, said control logic is further configured to:
   establish a friendship with said edge node; and
   determine whether a valid route to said destination node exists in response to a determination that said relay node is a friend node of said edge node, wherein a friend node comprises a node with which the relay node has a previous connection.

13. The wireless communication device of claim 11, wherein said route discovery process comprises said wireless communication device acting as a proxy relay of said edge node for route discovery.

14. The wireless communication device of claim 11, wherein said control logic is further configured to, responsive to a determination that route discovery process is in progress at said relay node, initiate forwarding of said packet to next nodes by flood-relaying.

15. The wireless communication device of claim 9, wherein said control logic is configured to participate in both flooding-based propagation and routing-based propagation, and wherein further said edge node and another relay node coupled to said edge node are configured to participate in only flooding-based propagation.

16. The wireless communication device of claim 9, wherein said control logic is further configured to: responsive to a determination that said indication indicates propagating said packet to said destination node by routing propagation through a valid route and responsive to a determination that said relay node is not encompassed in said valid route, discard said packet.

17. A network device comprising:
   communication circuitry configured to communicatively couple to a mesh network;
   a processor; and
   a memory storing instructions that, when executed by said processor, implement a method of forwarding data packets as a relay node in said mesh network, wherein said method comprises:
      receiving said packet at said relay node, wherein said packet identifies an edge node that generated said packet and a destination node and comprises an indication;
      determining if a valid route to said destination node exists and a propagation mode indicated by said indication, wherein said propagation mode is at least one of flooding propagation, routing propagation and propagation mode unspecified;
      responsive to the determination that a valid route to said destination node exists and said propagation mode is flooding propagation or propagation mode unspecified, modifying said indication in said packet to routing propagation; and
      forwarding said packet from said relay node to a next node by routing-relaying and in accordance with said valid route.

18. The network device of claim 17, wherein the method further comprises:
   responsive to a determination that no valid route exists after route discovery has been performed and said indication indicates propagating said packet by flooding or propagation mode unspecified, forwarding said packet to next nodes by flood-relaying.

19. The network device of claim 17, wherein the method further comprises:
   responsive to a determination that no route discovery has been performed, no valid route exists and said indication indicates propagating said packet by flooding propagation or propagation mode unspecified, initiating a route discovery process at said relay node to discover a route to said destination node.

20. The network device of claim 19, wherein said determining whether a valid route to said destination node exists is performed responsive to a determination that said edge node is a friend node with said relay node, wherein a friend node comprises a node with which the relay node has a previous connection.

21. The network device of claim 19, wherein said route discovery process comprises said relay node acting as a proxy relay of said edge node for route discovery.

22. The network device of claim 19, wherein said method further comprises, responsive to a determination that a route discovery process is in progress at said relay node, forwarding said packet to next nodes by flood-relaying.

23. The network device of claim 17, wherein said network device is directly linked to said edge node and another relay node, wherein said network device is configured to participate in both flooding propagation and routing propagation, and wherein further said edge node and said another relay node are configured to participate in only flooding propagation.

24. The network device of claim 17, wherein said method further comprises: responsive to a determination that said indication indicates propagating said packet by routing propagation through a valid route and responsive to a determination that said relay node is not encompassed in said valid route, discarding said packet.

* * * * *